US008332904B2

United States Patent
Rajamani et al.

(10) Patent No.: US 8,332,904 B2
(45) Date of Patent: Dec. 11, 2012

(54) CONTROL LINK FOR WIRELESS DISPLAY UNIT

(75) Inventors: Krishnan Rajamani, San Diego, CA (US); Samir S. Soliman, San Diego, CA (US); Nishith Chaubey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/611,798

(22) Filed: Nov. 3, 2009

(65) Prior Publication Data

US 2011/0107387 A1 May 5, 2011

(51) Int. Cl.
*H04N 7/18* (2006.01)
*H04N 7/173* (2011.01)
(52) U.S. Cl. .................. 725/126; 725/81; 725/116
(58) Field of Classification Search .......... 725/81, 725/116, 113, 141, 153, 126
See application file for complete search history.

(56) References Cited

U.S. PATENT DOCUMENTS

| 8,042,145 | B2 * | 10/2011 | Vergoossen et al. ........ 725/151 |
| 2004/0021948 | A1 | 2/2004 | Bläsi |
| 2006/0209745 | A1 | 9/2006 | MacMullan |
| 2007/0250870 | A1 | 10/2007 | Kim et al. |
| 2009/0093259 | A1 | 4/2009 | Edge et al. |

FOREIGN PATENT DOCUMENTS

| KR | 20090005936 A | 1/2009 |
| WO | WO2005013127 A1 | 2/2005 |
| WO | WO2007023337 A1 | 3/2007 |
| WO | WO2010027148 A2 | 3/2010 |

OTHER PUBLICATIONS

MediaFLO, "FLO™ Technology Overview", 2009, pp. 1-24, Qualcomm Incorporated.
International Search Report and Written Opinion—PCT/US2010/055157, International Search Authority—European Patent Office—Mar. 2, 2011.

* cited by examiner

*Primary Examiner* — Hunter B Lonsberry
(74) *Attorney, Agent, or Firm* — Donald C. Kordich (57) ABSTRACT

A method comprises establishing a session between a host and a display unit, including transmitting media content according to a television broadcasting standard, and implementing control traffic for the session on a bi-directional control link independent of the television broadcasting standard.

29 Claims, 4 Drawing Sheets

CONTROL LINK FOR WIRELESS DISPLAY UNIT

BACKGROUND

1. Field

The present disclosure generally relates to wirelessly controlling a viewing session and, more specifically, to using one or more links to control viewing of a media signal, such as a television signal.

2. Background

Wireless delivery of content to televisions and other monitors is desirable. A current solution for wireless content delivery transmits according to television broadcasting standards, which conventionally only permit one way communication. One way communication limits the effectiveness of control signaling. If transmission in accordance with two way standards is employed, the control traffic is typically multiplexed with the payload (i.e., media traffic), degrading the quality of the delivered media. Out of band control links have been suggested.

For example, Radiospire Networks, Inc. has created a system that uses a 900 MHz link to complement uncompressed 1080i video transmission in a proprietary format over a proprietary Ultra Wideband (UWB) modem. Radiospire Networks advertises that its system can be used to replace wired High Definition Multimedia Interface (HDMI) connections with the 1080i video transmission. The media is transmitted according to a proprietary protocol and cannot be processed by a standard television tuner. Thus, the Radiospire Networks system requires use of a proprietary transmitter and receiver. Furthermore, the Radiospire Networks system uses a proprietary control protocol.

In another example, though in the context of long-range transmissions, Qualcomm Incorporated has introduced a system referred to as MediaFLO™. The MediaFLO™ system transmits media content over licensed spectrum to subscriber stations (e.g., cellular telephones and Personal Digital Assistants (PDAs)). MediaFLO™ transmission is based upon a technique that includes the use of an encrypted Orthogonal Frequency Division Multiplexing (OFDM) set of Quadrature Amplitude Modulation (QAM) and Quadrature Phase Shift Keying (QPSK) signals. MediaFLO™ uses a Third Generation (3G) reverse link for control between subscriber stations and operations centers, where the operations centers are servers that are separate from the entities that serve the media content. The reverse link is a bi-directional link that traverses various intermediate devices (e.g., the cellular base station and routers) between the device consuming the media content and the respective operations center. MediaFLO™ transmission has been adopted as a television broadcast standard.

Neither of the examples above employs a transmission over a media link performed according to a television broadcast standard and controlled by a bi-directional link independent of the television broadcast standard.

SUMMARY

In one embodiment, a method includes transmitting media content over a media link according to a television broadcasting standard during a session between a host and a display unit. The method also includes transmitting control traffic for the session on a bi-directional control link independent of the television broadcasting standard.

In another embodiment, a system includes a Radio Frequency (RF) unit configured to process media content according to a television broadcast standard and to transmit and receive control signals according to a protocol different from the television broadcast standard. The system also includes a control unit in communication with the RF unit. The control unit sends and receives the control signals and performs control functions associated with the control signals.

In yet another embodiment, a computer program product tangibly embodied on a computer readable medium records computer program logic. The computer program product includes code that processes media content of a media link according to a television broadcast standard. The computer program product also includes code that communicates control signals over a bi-directional link to control a viewing session of the transmitted media content, the bi-directional link being independent of the television broadcast standard.

In still another embodiment, a system includes means for transmitting or receiving media content over the air using a television transmission standard. The system further includes means for controlling use of the media content through a bi-directional control link independent of the television transmission standard.

In another embodiment, a method includes establishing a session between a host and a display unit. The method includes transmitting media content on an over the air media link according to a television broadcasting standard, performing a discovery function to discover the display unit, and performing one of the following actions in response to the discovery function. The actions include implementing control traffic for the session on a bi-directional control link independent of the television broadcasting standard in response to a successful discovery function; and when an unsuccessful discovery occurs, control functions are not implemented on a bi-directional link.

In still another embodiment, a display system (e.g., a television) includes a tuner configured to receive and process media content from a media link according to a television broadcast standard. The display unit also has a control unit configured to establish a bi-directional control link with a transmitter of media signals. The bi-directional control link is independent of the television broadcast standard.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following description taken in conjunction with the accompanying drawings.

DETAILED DESCRIPTION

Figure 1:
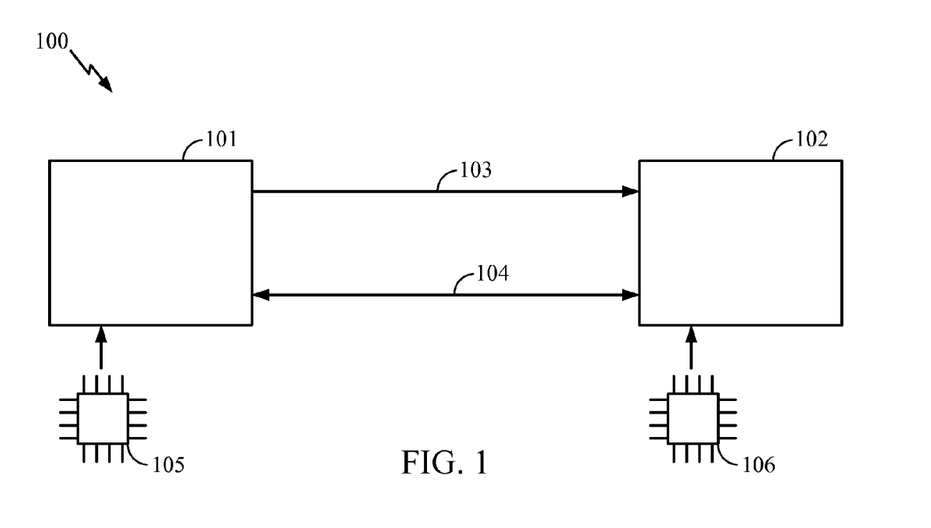
FIG. 1 is an illustration of an exemplary system, adapted according to one embodiment of the disclosure.

FIG. 1 is an illustration of an exemplary system 100, adapted according to one embodiment of the disclosure. The system 100 includes a host 101 and a display unit 102. Many types of devices can be used as hosts in various embodiments, such as computers, phones, set top boxes, stand-alone media receivers, entertainment systems, and the like. Similarly, many types of devices can be used as display units in various embodiments, such as adapted computer monitors, computers, adapted television sets, and any display device with a television tuner and other bi-directional communication capability.

The functionality of the host 101 and the display unit 102 is described in more detail below. Such functionality can be performed by hardware or software and in many embodiments is provided by one or more computer processors executing code that is saved to a computer readable storage medium. In some embodiments, a computer processor and memory with code stored thereon providing the functionality are included in a chipset for installation in any of a variety of devices. The functionality of the system 100 is provided by the chipsets 105 and 106, which are installed in the host 101 and the display unit 102, respectively.

The system 100 includes communication links 103 and 104. The communications link 103 permits one-way transmission of media content from the host 101 to the display unit 102. In one example, the communications link 103 includes a transmission according to a television broadcast standard in a "soft" licensed spectrum allowing for usage under specific conditions, (frequently referred to as "white space").

In one example according to FIG. 1, the host 101 transmits Advanced Television Systems Committee (ATSC) signals over the air on a white space channel, thereby acting as a television station transmitter. The display unit 102 can receive and process the media over the communications link 103 using, e.g., a conventional television tuner.

ATSC is only one example of a set of television transmission standards that can be employed by the communications link 103. Any of a variety of television standards, such as ATSC standards, Digital Video Broadcasting (DVB) standards, Integrated Services Digital Broadcasting (ISDB) standards, Digital Multimedia Broadcast (DMB) standards, and the like can be employed by embodiments to provide media content over the communications link 103.

The communications link 104 is a bi-directional link that includes the control signaling in this example embodiment. White space channel transmissions are typically only intended to cover a small area (e.g., a room), and embodiments that employ white space channel transmissions may also employ short-range transmissions for the communications link 104. For example, some embodiments may employ IEEE 802.11 (WiFi)™ communications for the communications link 104.

IEEE 802.11 is only one example of a protocol that may be used for the communications link 104, and other protocols may be used in the embodiments, as well. For example, an UltraWideband (UWB) link, infrared link, and/or a Bluetooth™ link may be used additionally to, or alternatively to, an IEEE 802.11 link. Furthermore, various embodiments may employ a long-range communication technique or a wired communication technique (e.g., IEEE 802.3 Ethernet) for the communications link 104. WiFi™, UWB, Bluetooth™, Ethernet, and the like are all different from, and independent of, any particular television broadcast standard and are widely implemented around the world. Furthermore, in various embodiments, the control link may be a point-point link rather than a link that traverses intermediate devices between the host 101 and the display unit 102. Additionally, it is noted that in the example of FIG. 1, the origination media link 103 and the control link 104 are co-located at the host 101, rather than being split between separate entities, as in MediaFLO™.

The system 100 includes at least one operating mode (shown in FIG. 1) that separates media content transmissions from control transmissions, implementing control transmissions out-of-band. For instance, the communications link 104 may be used for some or all of the control signals passed between the host 101 and the display unit 102. Examples of types of control functions include recognition and handshaking, security and privacy encryption, RF power control, determining whether the media is high definition or standard definition, digital content protection, channel switching (video channel selection can be an initial selection as well as dynamic channel changes coordinated via the control channel), display adjustment, display selection, host selection, multi-stream control (e.g., picture-in-a-picture), on-screen guide display, program selection, and the like. The control signals may be carried directly over the underlying Media Access Control (MAC) layer, over the network layer (e.g., Internet Protocol), or the like. In fact, signal transmission may be based upon Universal Plug and Play (UPnP) or an equivalent higher layer protocol.

The system 100 of FIG. 1 includes a plurality of operating modes, where the system 100 selects a mode based on operating conditions or user input. One such operating mode is described above, wherein media content is transmitted according to a television broadcast standard (e.g., ATSC) and wherein control signals are transmitted and received out-of-band using a protocol that is independent of the television broadcast standard.

In another operating mode, the system 100 ceases relying on the communications link 104 for control and falls back onto the capabilities of the communications link 103. In one example, the host 101 and the display unit 102 fail to recognize and authenticate each other, for instance, at start-up or initiation of the viewing session. However, the host 101 can still transmit the media content on the communications link 103, and the display unit 102 can still receive the media content on the communications link 103. In such a scenario, the host 101 and/or the display unit 102 can be used for channel changing, but more advanced operations, such as privacy encryption may be unavailable.

Yet another operating mode includes sending the media content on the communications link 104 instead of, or in addition to, sending the media content on the communications link 103. Thus, in one example using ATSC, which is limited to twenty megabits per second or less of throughput, the media content includes more than twenty megabits per second. In such a scenario, some or all of the media content can be moved to the communications link 104. However, such operating mode may experience some amount of performance degradation due to the additional demands on the communications link 104 from carrying both control communications and media content. For instance, video and/or audio may be perceptibly interrupted or affected by some control communications that share space on the communications link 104.

Figure 2:
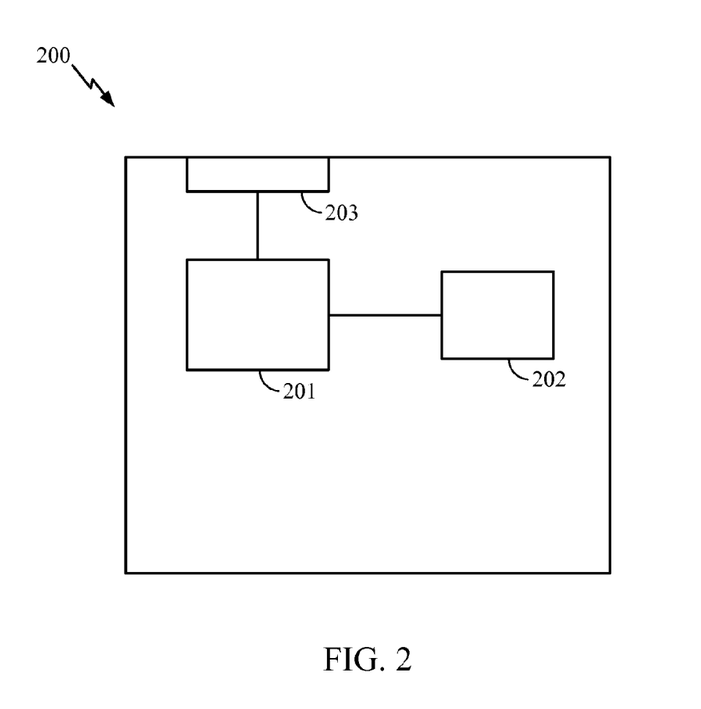
FIG. 2 is an illustration of an exemplary device, adapted according to one embodiment of the disclosure.

FIG. 2 is an illustration of the exemplary device 200 adapted according to one embodiment of the disclosure. The device 200 may be, for example, a host or a display unit, as shown in FIG. 1. The device 200 includes the transmitting and receiving unit 201, which communicates control signals bi-directionally, as in the case of the communications link 104 of FIG. 1. The input/output port 203 may include, for example, an antenna, a wired data port, or other apparatus to send and receive control signals. Furthermore, the transmitting and receiving unit 201 is also operable to transmit and/or receive media content signals using a television broadcast standard. The input/output port 203 may further include, e.g., a television antenna to send and/or receive media content signals. The device 200 further includes the control unit 202 in communication with the transmitting and receiving unit 201. The control unit 202 sends and receives the control signals and performs control functions associated with the control signals.

In various embodiments, the transmitting and receiving unit 201 may include, for example, one or more Radio Frequency (RF) units that send and/or receive RF signals. Furthermore, various embodiments may implement the control unit 202 as a processor (e.g., a general purpose processor, an Application Specific Integrated Circuit (ASIC), a Digital Signal Processor (DSP), and/or the like). In fact, various embodiments may implement the units 201 and 202 in a single chipset or semiconductor die.

Figure 3:
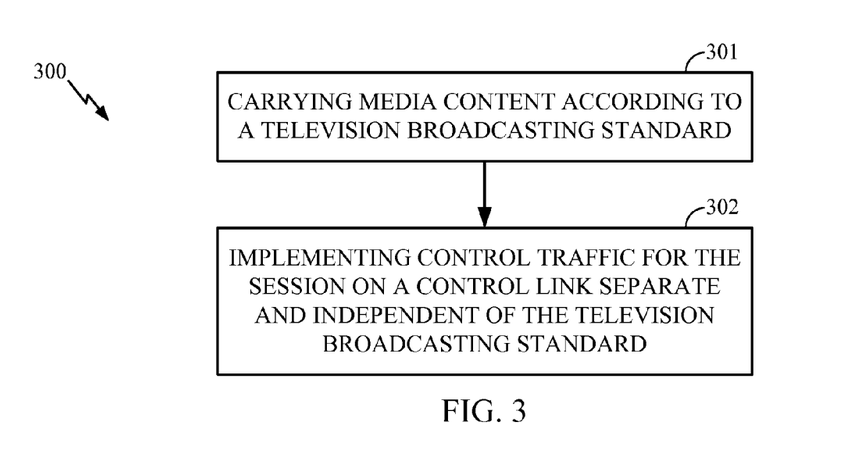
FIG. 3 is an illustration of an exemplary method, adapted according to one embodiment of the disclosure.

Some embodiments include methods for establishing a viewing session. FIG. 3 is an illustration of the exemplary method 300, adapted according to one embodiment of the disclosure. The method 300 is performed in some embodiments by, e.g., a host or a display unit.

In block 301, media content is carried according to a television broadcasting standard. For instance, from the perspective of a host, block 301 includes transmitting the media content, whereas, from the perspective of a display unit, block 301 includes receiving media content and passing it to other circuitry for processing. Block 301 may include carrying compressed signals, depending on the television standard used.

In block 302, control traffic for the session is implemented on a control link separate and independent of the television broadcasting standard. For instance, either or both of a host and a display unit may begin transmitting control signals in an attempt to establish bi-directional communication therebetween. Thus, either or both of a host and a display unit implement discovery and authentication protocols to initiate bi-directional control traffic. In one example, a host attempts to initiate bi-directional control communication by transmitting a control signal to be received by one or more known or unknown display units. A display unit that receives the control signal may or may not respond depending on a number of facts, such as whether the control signal specifies the same or a different display unit. When display units receive the transmitted signal, one or more of the display units can then perform mutual discovery and mutual authentication with the host as part of the viewing session.

The control traffic can be implemented using any of a variety of techniques. For instance, protocols used in Local Area Networks (LANs), Personal Area Networks (PANs), and even wired networks and Wide Area Networks (WAN) can be used as a vehicle for implementing the control traffic. In some embodiments, the bi-directional control signaling between hosts and receivers is similar to that in peer-to-peer type networks.

Control traffic includes signals used for any of a variety of functions. Discovery and authentication, mentioned above, are two functions performed over a control link. Another control function includes video privacy/content protection key derivation, for example, by High Bandwidth Digital Content Protection (HDCP) authentication and key exchange, or the like. Furthermore, control of the display unit itself can be performed over the control link, such as by channel selection. In one example, channel selection is performed over the control link using a known protocol, such as Consumer Electronics Control (CEC, part of the HDMI standard). Other kinds of control unit display, such as color setting, language, control of multiple streams (e.g., picture-in-a-picture or switching among signals from multiple hosts), and the like are implemented over the control link in various embodiments. Any of a variety of control functions now know or later developed my be performed using the control link of the method 300.

Figure 4:
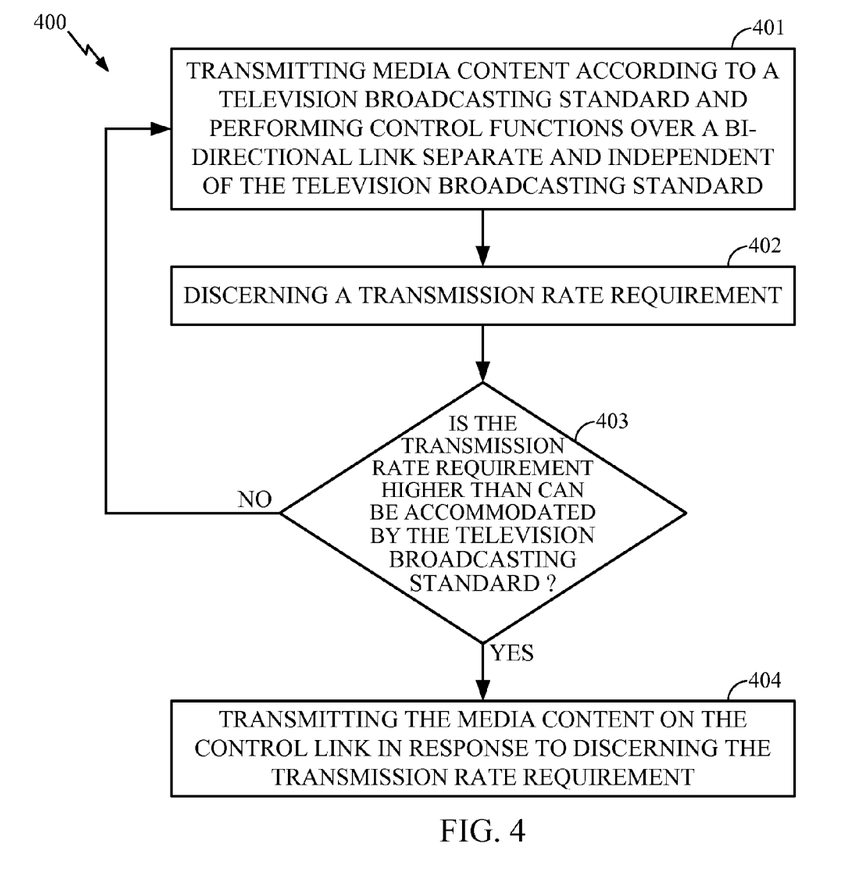
FIG. 4 is an illustration of an exemplary method, adapted according to one embodiment of the disclosure.

FIG. 4 is an illustration of the exemplary method 400, adapted according to one embodiment of the disclosure. The method 400 is performed in some embodiments by, e.g., a host during initiating of a viewing session but may also be performed during a viewing session. In block 401, the viewing session includes the media content being transmitted using a television broadcasting standard and the control traffic being transmitted using a bi-directional control link separate and independent of the television broadcasting standard.

In block 402, the host discerns a transmission rate requirement. For example, in one embodiment, the host monitors its own inputs and discerns the transmission rate requirement for the media content therefrom. Embodiments can use any of a variety of techniques to discern a transmission rate requirement.

In block 403, it is determined whether the transmission rate requirement is higher than can be accommodated by the television broadcast standard. In one example, the viewing system utilizes an ATSC white space channel for sending the media content from the host to the display. ATSC white space channels have a transmission rate limit of around twenty megabits per second. If it is determined that the media content requires more than twenty megabits per second (e.g., during use of a video game application), then the host transmits some or all of the media content on the control link in block 404. If the transmission rate requirement for the media content is within the capabilities of the television broadcast standard, then the host continues to transmit the media content according to the television broadcast standard in block 401. Another reason to fall back to the control link to transmit the media content (besides a higher rate requirement) is when it is discerned that the receiver lacks support for the TV broadcast standard. Rate requirements, abilities to support broadcast standards, and the like are discernible, e.g, via the initial control link exchange. The actions in blocks 402 and 403 can be performed continually, periodically, at startup, and/or any other time. Reverting back to the television broadcast standard transmission for media transfer (after a prior choice to use the control link) is also possible. For instance, if the control link is congested or otherwise unsuitable for smooth video transmission at any bitrate, it may be better to use the television broadcast standard transmission within a bitrate supported by the television broadcast standard.

Figure 5:
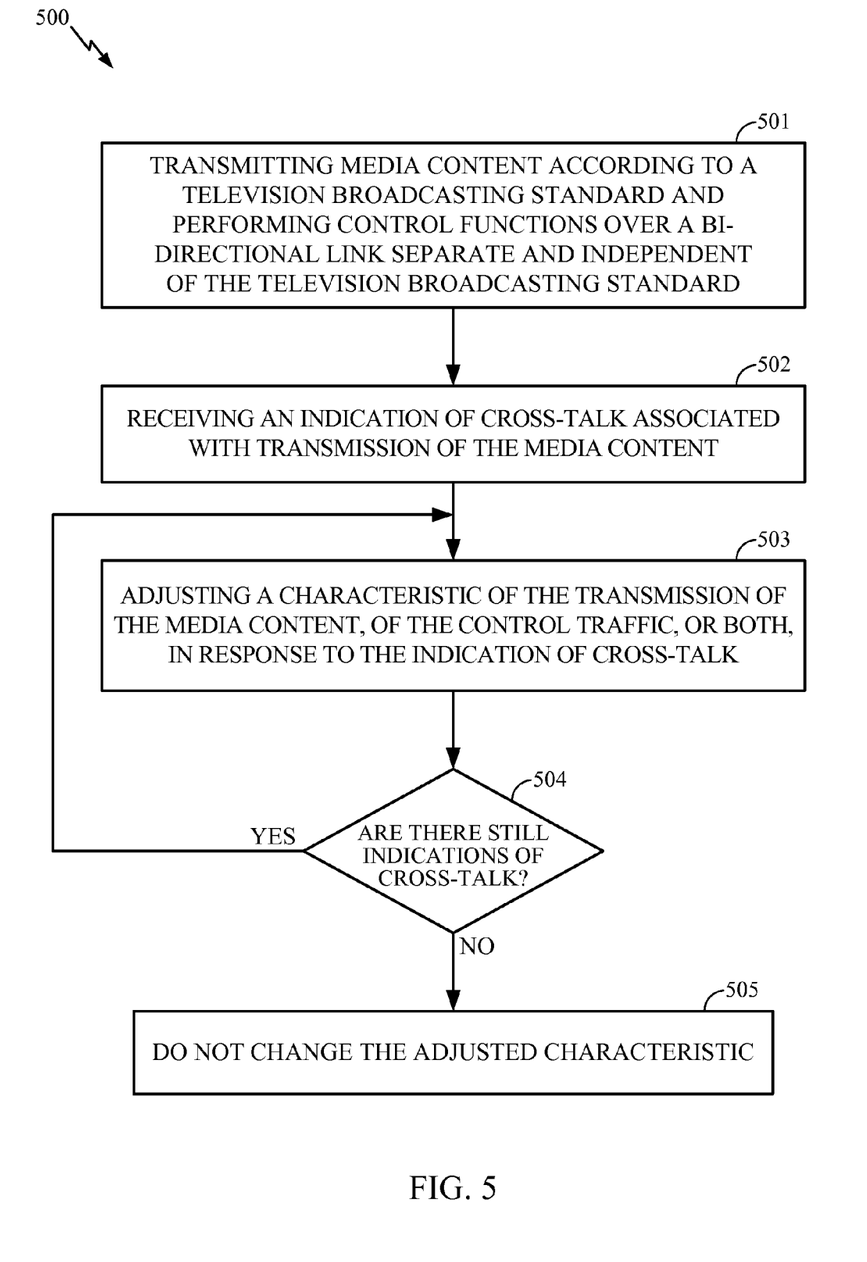
FIG. 5 is an illustration of an exemplary method, adapted according to one embodiment of the disclosure.

FIG. 5 is an illustration of the exemplary method 500, adapted according to one embodiment of the disclosure for ameliorating undesirable phenomena by, e.g., implementing RF power control. In embodiments that use white space channels, RF power control can help to reduce interference among transmitters. Method 500 is performed in this example, by a host (e.g., the host 101 of FIG. 1). In block 501, the host transmits media content and control traffic, as in block 401 of FIG. 4.

In block 502, an indication of interference (e.g., cross-talk) associated with transmission of the media content is received, e.g., via the control link. For instance, a display unit experiencing cross-talk may send a control signal to one or more hosts to cause one or more of the hosts to change a transmit power to ameliorate the cross-talk. Furthermore, hosts may communicate among each other to negotiate to reduce cross-talk.

In block 503, adjustment of a characteristic of the transmission of the media content, of the control traffic, or both, is performed in response to the indication of cross-talk. For instance, the host may change a transmit power, a transmit channel, or a transmit direction in response to the indication of cross-talk.

In block 504, it is determined whether there are more indications of cross-talk. If there are, one or more characteristics may be adjusted again at block 504. If there are no more indications of cross-talk, then characteristics of the media content transmit are not adjusted (at least with respect to cross-talk) in block 505.

The feedback loop functionality shown in FIG. 5 is not limited to the elimination of cross-talk and, in fact, may be extended for other uses. In one example, a display unit receiving a poor media signal from a host sends a control signal to the host indicating poor media signal quality. In response, the host increases power of the media signal or otherwise changes a characteristic of the media signal until the signal reception improves. Another adjustment that can be made in block 503 includes falling back to the control link for media content transfer. FIG. 5 is shown with respect to the point of view of a host. In some embodiments, display units have functionality therein to recognize cross-talk, poor reception, and the like and to send control signals to nearby hosts to indicate such problems and to negotiate with one or more hosts to reduce or eliminate undesirable phenomena. Accordingly, one aspect of the method 500 is peer-to-peer communication between and among hosts and display units to minimize undesirable phenomena.

Figure 6:
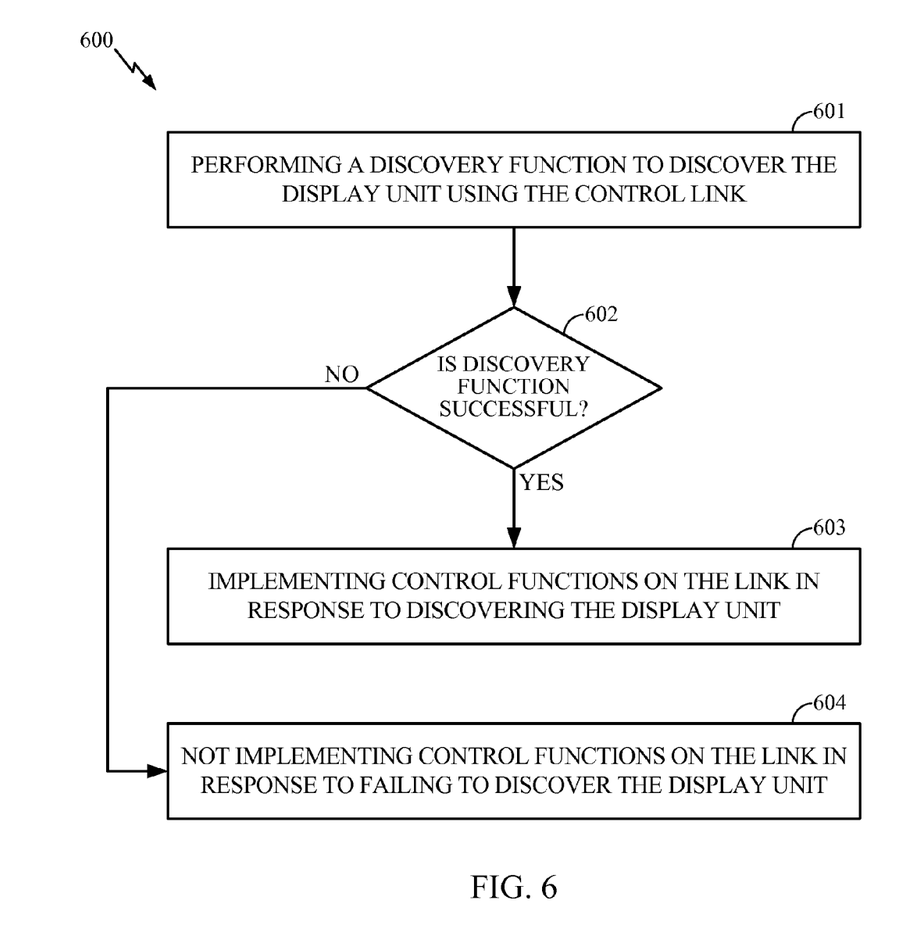
FIG. 6 is an illustration of an exemplary method, adapted according to one embodiment of the disclosure.

FIG. 6 is an illustration of the exemplary method 600, adapted according to one embodiment of the disclosure. The method 600 may be performed in this example, by a host such as the host 101 of FIG. 1. In block 601, a discovery function is performed to discover the display unit using the control link. For example, any of a variety of protocols now known or later developed for reaching out to one or more other devices and recognizing one or more of the devices can be used. For instance, either sending or receiving beacon signals and then handshaking is performed by some embodiments.

In block 602, it is discerned whether the discovery function was successful. If the discovery function was not successful, then control functions are not implemented on the link and, in fact, no bi-directional link is established in block 604. In such a scenario, the viewing session is limited to the functionality provided by the television transmission standard and control devices of the display unit (e.g., a separate remote control unit or keypad of the display unit). If the discovery is successful, then control functions are implemented on the link in block 603.

The method 600 provides a technique for adapting to availability of a bi-directional control link. Thus, when the bi-directional control link is available, it is used. On the other hand, when no bi-directional control link is available, the system falls back on the functionality inherent in the television broadcasting standard and functionality available through other control means of the display unit.

Various embodiments of the disclosure provide advantages over prior art techniques. For example, a bi-directional control link can provide for a feedback loop, as illustrated in FIG. 6, allowing for the mitigation of undesirable phenomena such as cross-talk and poor reception. Additionally, separating control transmissions and media transmissions into separate links can, in some instances, improve the performance with respect to both control and media since control and media do not compete for time and/or bandwidth in the same link.

Embodiments of the disclosure can be adapted for a variety of applications. In one example, a laptop computer is used as a host, and a television is used as a display. A user inserts a DVD into the DVD drive of the laptop, and everything on the laptop monitor is displayed by the television. In another example, a computer is a host, and a projector is a display unit to provide a presentation in a conference room or office. In the context of a car, a Global Positioning System (GPS)-enabled phone is a host, and a car's display is used to display maps and directions from the phone. In another handset example, a handset communicates with a television to transmit, e.g., emails and other messages, to a television. The functionality described above with respect to FIGS. 3-6 can be implemented in televisions, handsets, and the like by, e.g., including chipsets that are enabled to transmit media and control signals as described above. Furthermore, PC cards can be used to add such functionality to office and home computers. Various embodiments can be implemented in devices including, but not limited to, music players, video players, entertainment units, communications devices, PDAs, s desktop computers, smartphones, netbooks, smartbooks, and laptop computers.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A method comprising:
discerning a transmission rate requirement;
transmitting media content over a media link according to a television broadcasting standard during a session between a host and a display unit on a bi-directional control link in response to discerning the transmission rate requirement; and
transmitting control traffic for the session on the bi-directional control link independent of the television broadcasting standard.

2. The method of claim 1, wherein transmitting control traffic comprises:
   discovering the display unit; and
   authenticating the display unit.

3. The method of claim 1 wherein the control traffic includes signals for at least one of the following functions:
   mutual discovery;
   mutual authentication;
   video privacy key derivation;
   content protection;
   video channel selection;
   transmission power control;
   host selection;
   multi-stream composition control; and
   display unit control.

4. The method of claim 1 wherein the television broadcasting standard comprises a digital television standard.

5. The method of claim 4 wherein the digital television standard is selected from a list consisting of:
   an Advanced Television Systems Committee (ATSC) standard;
   a Digital Video Broadcasting (DVB) standard;
   an Integrated Services Digital Broadcasting (ISDB) standard; and
   a Digital Multimedia Broadcast (DMB) standard.

6. The method of claim 1 wherein the control link comprises a short-range link.

7. The method of claim 1 wherein the control link comprises at least one of:
   an IEEE 802.11 link;
   an infrared link
   an Ultra Wideband (UWB) link;
   a Personal Area Network (PAN) link; and
   an IEEE 802.3 link.

8. The method of claim 1 wherein implementing control traffic comprises:
   transmitting discovery signals.

9. The method of claim 1 comprising:
   discerning unsuitability of the control link for transmitting the media content; and
   in response to discerning unsuitability of the control link, transmitting the media content over the media link within a bitrate supported by the television broadcast standard.

10. The method of claim 1 wherein the media content is transmitted on at least one white space channel.

11. The method of claim 1 further comprising:
    receiving an indication of interference associated with transmission of the media content; and
    adjusting a characteristic of the transmission of at least one of the media content and the control traffic in response to the indication of interference.

12. The method of claim 11, wherein adjusting the characteristic comprises at least one of adjusting media content transmission power and transmitting the media content over the control link.

13. The method of claim 1 further comprising:
    receiving from the display unit an indication of signal quality; and
    adjusting a characteristic of transmission of at least one of the media content and the control traffic in response to the indication of signal quality.

14. The method of claim 1 performed by a single wireless host unit.

15. A system comprising
    a Radio Frequency (RF) unit configured to process media content according to a television broadcast standard and to transmit and receive control signals according to a protocol different from the television broadcast standard; and
    a control unit in communication with the RF unit, the control unit sending and receiving the control signals and performing control functions associated with the control signals,
    wherein the system is integrated into a PC card.

16. The system of claim 15 incorporated into a device selected from a group consisting of a music player, a video player, an entertainment unit, a communications device, a personal digital assistant (PDA), a desktop computer, a smartphone, a netbook, a smartbook, and a laptop computer.

17. The system of claim 15 in which the system is integrated into a semiconductor die.

18. A system comprising:
    means for transmitting or receiving media content over the air on a media link using a television transmission standard; and
    means for controlling use of the media content through a bi-directional control link independent of the television transmission standard.

19. The system of claim 18 implemented in at least one of a handheld communication device and a personal computer.

20. The system of claim 18 implemented in at least one of a computer monitor and a television.

21. The system of claim 18 wherein the bi-directional link comprises one or more of:
    an IEEE 802.11 link;
    an infrared link;
    an Ultra Wideband (UWB) link;
    a Personal Area Network (PAN) link; and
    an IEEE 802.3 link.

22. A computer program product comprising:
    a non-transitory computer readable medium having computer program code recorded thereon, the computer program code comprising:
    program code to discern a transmission rate requirement;
    program code to process media content of a media link according to a television broadcast standard on a bi-directional control link in response to discerning the transmission rate requirement; and
    program code to communicate control signals over the bi-directional link to control a viewing session of the transmitted media content, the bi-directional link being independent of the television broadcast standard.

23. The computer program product of claim 22 wherein the media link is within at least one white space channel.

24. The computer program product of claim 22 further comprising:
    code that sends control signals in response to cross-talk associated with transmission of the media content.

25. A method comprising:
    establishing a session between a host and a display unit, including:
    transmitting media content on an over the air media link according to a television broadcasting standard;
    performing a discovery function to discover the display unit; and
    performing one of the following actions in response to the discovery function:
    implementing control traffic for the session on a bi-directional control link independent of the television broadcasting standard in response to a successful discovery function; and implementing no control traffic on a bi-directional link in response to an unsuccessful discovery function.

26. A display system, comprising:

a tuner configured to receive and process media content from a media link according to a television broadcast standard; and a control unit configured to establish a bi-directional control link with a transmitter of media signals, the bi-directional control link being independent of the television broadcast standard, wherein the display system further discerns a lack of support for the television broadcast standard.

27. The display system of claim 26 comprising a television.

28. A method comprising:

discerning a lack of support for the television broadcast standard at the display unit;

transmitting media content over a media link according to a television broadcasting standard during a session between a host and a display unit on a bi-directional control link; and transmitting control traffic for the session on the bi-directional control link independent of the television broadcasting standard.

29. A method comprising:

transmitting media content over a media link according to a television broadcasting standard during a session between a host and a display unit; and transmitting control traffic for the session on a bi-directional control link independent of the television broadcasting standard, the bidirectional control link comprising a point-to-point link.

* * * * *